(12) United States Patent
Bowers et al.

(10) Patent No.: US 8,132,073 B1
(45) Date of Patent: Mar. 6, 2012

(54) DISTRIBUTED STORAGE SYSTEM WITH ENHANCED SECURITY

(75) Inventors: Kevin D. Bowers, Melrose, MA (US); Ari Juels, Brookline, MA (US); Alina Oprea, Waltham, MA (US)

(73) Assignee: EMC Corporation, Hopkinton, MA (US)

(*) Notice: Subject to any disclaimer, the term of this patent is extended or adjusted under 35 U.S.C. 154(b) by 500 days.

(21) Appl. No.: 12/495,189

(22) Filed: Jun. 30, 2009

(51) Int. Cl.
*H03M 13/00* (2006.01)
(52) U.S. Cl. ........ 714/755; 714/776; 714/758; 714/799; 714/6.24; 713/189; 713/176; 713/160; 713/181; 713/193
(58) Field of Classification Search .................. None
See application file for complete search history.

(56) References Cited

U.S. PATENT DOCUMENTS

| | | | |
|---|---|---|---|
| RE34,100 E * | 10/1992 | Hartness ........................ | 714/769 |
| 7,137,045 B2 * | 11/2006 | Hwang et al. .................. | 714/703 |
| 7,330,370 B2 * | 2/2008 | Rinerson et al. .............. | 365/158 |
| 2003/0061551 A1 * | 3/2003 | Kim et al. ....................... | 714/701 |
| 2006/0136728 A1 * | 6/2006 | Gentry et al. .................. | 713/176 |
| 2008/0178058 A1 * | 7/2008 | Kuo et al. ....................... | 714/755 |
| 2008/0201581 A1 * | 8/2008 | Kameyama et al. ........... | 713/189 |
| 2009/0055682 A1 * | 2/2009 | Gibson et al. ..................... | 714/6 |
| 2009/0103531 A1 * | 4/2009 | Katis et al. ..................... | 370/389 |

OTHER PUBLICATIONS

C. Cachin et al., "Asynchronous Verifiable Information Dispersal," 24th IEEE Symposium on Reliable Distributed Systems, Nov. 2004, 20 pages.*
C. Cachin et al., "Asynchronous Verifiable Secret Sharing and Proactive Cryptosystems," Proceedings of the 9th ACM Conference on Computer and Communications Security, Aug. 2002, 25 pages, Washington DC, USA.*
M. Castro et al., "Proactive Recovery in a Byzantine-Fault-Tolerant System," 4th Symposium on Operating System Design and Implementation, Oct. 2000, 15 pages.*
J.A. Garay et al., "Secure Distributed Storage and Retrieval," Theoretical Computer Science 243, Jul. 2000, pp. 363-389.*
A. Herzberg et al., "Proactive Public Key and Signature Systems," Proceedings of the 4th ACM Conference on Computer and Communications Security, Dec. 1996, 15 pages.*
A. Herzberg et al., "Proactive Secret Sharing or: How to Cope with Perpetual Leakage," CRYPTO, Springer-Verlag, Nov. 1995, 22 pages.*
K.D. Bowers et al., "Proofs of Retrievability: Theory and Implementation," IACR ePrint Report, 2008, pp. 1-24.*

(Continued)

*Primary Examiner* — John Trimmings
(74) *Attorney, Agent, or Firm* — Ryan, Mason & Lewis, LLP

(57) ABSTRACT

A client device or other processing device separates a file into blocks and distributes the blocks across multiple servers for storage. In one aspect, subsets of the blocks are allocated to respective primary servers, a code of a first type is applied to the subsets of the blocks to expand the subsets by generating one or more additional blocks for each subset, and the expanded subsets of the blocks are stored on the respective primary servers. A code of a second type is applied to groups of blocks each including one block from each of the expanded subsets to expand the groups by generating one or more additional blocks for each group, and the one or more additional blocks for each expanded group are stored on respective secondary servers. The first and second codes are advantageously configured to provide security against an adversary that is able to corrupt all of the servers over multiple periods of time but fewer than all of the servers within any particular one of the periods of time.

25 Claims, 6 Drawing Sheets

OTHER PUBLICATIONS

J. Hendricks et al., "Verifying Distributed Erasure-Coded Data," 26th ACM Symposium on Principles of i Distributed Computing, Aug. 2007, 8 pages.*

G. Ateniese et al., "Scalable and Efficient Provable Data Possession," Proceedings of the 4th International Conference on Security and Privacy in Communication Networks, Apr. 2008, 11 pages.

M. Bellare et al., "Forward-Security in Private-Key Cryptography," Topics in Cryptology—CT-RSA, Nov. 2000, 24 pages.

J. Black et al., "UMAC: Fast and Secure Message Authentication," CRYPTO '99, Advances in Cryptology, Aug. 1999, 18 pages.

M. Blum et al., "Checking the Correctness of Memories," Algorithmica, Oct. 1992, 21 pages, vol. 12, Nos. 2-3.

J.L. Carter et al., "Universal Classes of Hash Functions," Extended Abstract, Proceedings of the 9th Annual ACM Symposium on Theory of Computing, May 1977, pp. 106-112.

R. Curtmola et al., "Robust Remote Data Checking," 4th ACM International Workshop on Storage Security and Survivability, Oct. 2008, 6 pages.

R. Curtmola et al., "MR-PDP: Multiple-Replica Provable Data Possession," International Conference on Distributed Computing Systems, Jun. 2008, 10 pages.

M. Etzel et al., "Square Hash: Fast Message Authentication via Optimized Universal Hash Functions," CRYPTO '99, Advances in Cryptology, Aug. 1999, 21 pages.

D.L.G. Filho et al., "Demonstrating Data Possession and Uncheatable Data Transfer," IACR, Report 2006/150, http://eprint.iacr.org/2006/150, 2006, 9 pages.

G.R. Goodson et al., "Efficient Byzantine-Tolerant Erasure-Coded Storage," 34th International Conference on Dependable Systems and Networks, Jun.-Jul. 2004, pp. 135-144.

S. Halevi et al., "MMH: Software Message Authentication in the Gbit/second Rates," Fast Software Encryption: 4th International Workshop, FSE '97, Mar. 1997, pp. 1-15, Haifa, Israel.

J. Hendricks et al., "Verifying Distributed Erasure-Coded Data," 26th ACM Symposium on Principles of Distributed Computing, Aug. 2007, 8 pages.

A. Herzberg et al., "Proactive Secret Sharing or: How to Cope with Perpetual Leakage," CRYPTO, Springer Verlag, Nov. 1995, 22 pages.

H. Krawczyk, "LFSR-based Hashing and Authentication," CRYPTO, Springer-Verlag, Aug. 1998, pp. 129-139.

W. Litwin et al., "Algebraic Signatures for Scalable Distributed Data Structures," 20th International Conference on Data Engineering, Mar.-Apr. 2004, 12 pages.

M. Naor et al., "The Complexity of Online Memory Checking," 46th Annual Symposium on Foundations of Computer Science, Oct. 2005, pp. 1-38.

W. Nevelsteen et al., "Software Performance of Universal Hash Functions," Advances in Cryptology, Eurocrypt, Springer-Verlag, May 1999, pp. 1-17.

M.O. Rabin et al., "Efficient Dispersal of Information for Security, Load Balancing, and Fault Tolerance," Journal of the Association for Computing Machinery, Apr. 1989, pp. 335-348, vol. 36, No. 2.

P. Rogaway, "Bucket Hashing and its Application to Fast Message Authentication," Journal of Cryptology, Oct. 1997, pp. 1-24.

H. Shacham et al., "Compact Proofs of Retrievability," Proceedings of Asiacrypt, Report 2008/073, Dec. 2008, pp. 1-36.

M.A. Shah et al., "Auditing to Keep Online Storage Services Honest," Proceedings of the 11th USENIX Workshop on Hot Topics in Operating Systems, May 2007, 6 pages, No. 11, San Diego, CA, USA.

V. Shoup, "On Fast and Provably Secure Message Authentication Based on Universal Hashing," CRYPTO 1996, Dec. 1996, pp. 313-328, vol. 1109.

A. Juels et al., "PORs: Proofs of Retrievability for Large Files," ACM CCS, 2007, 22 pages.

G. Ateniese et al., "Provable Data Possession at Untrusted Stores," ACM CCS, 2007, pp. 598-610.

M. Lillibridge et al., "A Cooperative Internet Backup Scheme," Proceedings of the General Track: 2003 USENIX Annual Technical Conference, Jun. 9-14, 2003, pp. 29-41, San Antonio, Texas, USA.

T. Schwarz et al., "Store, Forget, and Check: Using Algebraic Signatures to Check Remotely Administered Storage," IEEE International Conference on Distributed Computing Systems (ICDCS), 2006, 10 pages.

J.S. Plank et al., "A Performance Evaluation and Examination of Open-Source Erasure Coding Libraries for Storage," 7th USENIX Conference on File and Storage Technologies (FAST), 2009, pp. 253-265.

* cited by examiner

FIG. 4

```
Experiment Exp_A^HAIL(π):
  κ = (sk, pk) ← keygen(1^λ)
  F ← A("test", pk, π)                        /* output file F */
  {F_0^(i)}_{i=1}^n ← encode(κ, F, ℓ, n, b)    /* compute file shares */
  for t = 0 to T do
    A_t ← A("corrupt servers")                 /* set of corrupted servers */
    for i = 1 to n do
      V_i ← 0                                  /* number of correct replies for S_i */
    for a = 1 to n_q do                        /* generate n_q challenges */
      C = (C_1,...,C_n) ← challenge(κ)
      for j = 1 to n do                        /* challenge all servers */
        if j ∈ A_t then                        /* A responds for
          R_j ← A("respond", C_j, F̂_t^(j))      corrupted servers */
        else R_j ← respond(j, C_j, F̂_t^(j))
      for j = 1 to n do                        /* verify all responses */
        if verify(κ, j, {C_i, R_i}_{i=1}^n) = 1 then
          V_j ← V_j + 1                        /* S_j replied correctly */
    S_corr ← Φ         /* servers with small fraction of incorrect replies */
    for j = 1 to n do     /* compute fraction of correct replies */
      if V_j/n_q ≥ 1 - ε_q then
        S_corr ← S_corr ∪ {j}    /* S_j's incorrect replies below ε_q */
    if S_corr = {1, 2, ..., n} then
      {F_{t+1}^(i)}_{i=1}^n ← {F̂_t^(i)}_{i=1}^n    /* shares remain the same */
    else {F_{t+1}^(i)}_{i=1}^n ← redistribute(κ, t, {F̂_t^(i)}_{i=1}^n)
  if decode(κ, T, {F̂_T^(i)}_{i=1}^n) = F output 0    /* F can be recovered */
  else output 1                                       /* F is corrupted */
```

US 8,132,073 B1

DISTRIBUTED STORAGE SYSTEM WITH ENHANCED SECURITY

FIELD OF THE INVENTION

The present invention relates generally to the field of data storage, and more particularly to cryptographic techniques for verifying that a given stored file is intact and retrievable.

BACKGROUND OF THE INVENTION

Cloud storage generally refers to a family of increasingly popular on-line services for archiving, backup, and even primary storage of files. Amazon S3 (Simple Storage Service) from amazon.com is a well-known example. Cloud storage providers offer users clean and simple file-system interfaces, abstracting away the complexities of direct hardware management. At the same time, though, such services eliminate the direct oversight of component reliability and security that enterprises and other users with high service-level requirements have traditionally expected.

A number of different approaches to verification of file availability and integrity have been developed in order to restore security assurances eroded by cloud environments. One such approach uses proofs of retrievability (PORs), described in A. Juels et al., "PORs: Proofs of retrievability for large files," ACM CCS, pages 584-597, 2007. A POR is a challenge-response protocol that enables a prover (e.g., a cloud storage provider) to demonstrate to a verifier (e.g., a client or other user) that a file F is retrievable, i.e., recoverable without any loss or corruption. A POR uses file redundancy within a server for verification. The benefit of a POR over simple transmission of F is efficiency. The response can be highly compact (e.g., tens of bytes), and the verifier can complete the proof using a small fraction of F.

Another approach is based on proofs of data possession (PDPs), described in G. Ateniese et al., "Provable data possession at untrusted stores," ACM CCS, pages 598-609, 2007. A typical PDP detects a large fraction of file corruption, but does not guarantee file retrievability. Roughly speaking, a PDP provides weaker assurances than a POR, but potentially greater efficiency.

As standalone tools for testing file retrievability against a single server, though, PORs and PDPs are of limited value. Detecting that a file is corrupted is not helpful if the file is irretrievable and thus the client has no recourse.

Thus PORs and PDPs are mainly useful in environments where F is distributed across multiple systems, such as independent storage services. In such environments, F is stored in redundant form across multiple servers. A verifier can test the availability of F on individual servers via a POR or PDP. If it detects corruption within a given server, it can appeal to the other servers for file recovery.

Other conventional approaches provide distributed protocols that rely on queries across servers to check file availability. See, for example, M. Lillibridge et al., "A cooperative Internet backup scheme," USENIX Annual Technical Conference, General Track 2003, pages 29-41, 2003, and T. Schwarz et al., "Store, forget, and check: Using algebraic signatures to check remotely administered storage," International Conference on Distributed Computing Systems (ICDCS), 2006. In the Lillibridge et al. approach, blocks of a file F are dispersed across n servers using an (n,m)-erasure code (i.e., any m out of the n fragments are sufficient to recover the file). Servers spot-check the integrity of one another's fragments using message authentication codes (MACs). The Schwartz et al. approach ensures file integrity through distribution across multiple servers, using error-correcting codes and block-level file integrity checks. This approach employs keyed algebraic encoding and stream-cipher encryption to detect file corruptions.

However, the various known approaches noted above are deficient in important respects. For example, none of these approaches adequately addresses the case of what we refer to herein as a "mobile adversary," that is, one that is capable of progressively attacking storage providers and, in principle, ultimately corrupting all providers at different times.

SUMMARY OF THE INVENTION

Illustrative embodiments of the present invention overcome the deficiencies of conventional practice by providing an improved distributed storage system particularly well suited for use in cloud storage environments. The distributed storage system in one or more such embodiments incorporates cryptographic functionality referred to herein as High-Availability and Integrity Layer (HAIL).

In one aspect of the invention, a client device or other processing device separates a file into blocks and distributes the blocks across multiple servers for storage. Subsets of the blocks are allocated to respective primary servers, a code of a first type is applied to the subsets of the blocks to expand the subsets by generating one or more additional blocks for each subset, and the expanded subsets of the blocks are stored on the respective primary servers. A code of a second type is applied to groups of blocks each including one block from each of the expanded subsets to expand the groups by generating one or more additional blocks for each group, and the one or more additional blocks for each expanded group are stored on respective secondary servers. The first and second codes are advantageously configured to provide security against an adversary that is able to corrupt all of the servers over multiple periods of time but fewer than all of the servers within any particular one of the periods of time.

In one of the illustrative embodiments, the code of the first type comprises an adversarial server code and the code of the second type comprises a dispersal code. A given one of the additional blocks generated by applying the dispersal code to one of the groups of blocks comprises a parity block that also serves as a MAC. The dispersal code may more specifically comprise an integrity-protecting error-correcting code having codewords each providing a MAC based on a universal hash function. As a more particular example, the integrity-protecting error-correcting code may comprise an (n,l,d) Reed-Solomon code modified by applying a pseudorandom function to s code symbols of a given codeword of the Reed-Solomon code in order to generate the MAC for the corresponding codeword of the integrity-protecting error-correcting code, where n denotes the total number of primary and secondary servers, l denotes the number of primary servers, d denotes the minimum distance between any two Reed-Solomon codewords, and $1 \leq s \leq n$.

Verification of availability and integrity of the file stored across the multiple servers may be implemented using a challenge-response protocol in which challenges are periodically issued to respective ones of the servers and responses to the challenges are processed to determine if the number of corrupted blocks exceeds a specified maximum number. The processing of the responses may involve verifying an aggregation code combining information associated with multiple ones of the responses. For example, the aggregation code may combine multiple MACs from respective ones of the servers into a composite MAC for multiple ones of the blocks, with each such composite MAC being associated with a corresponding codeword of the dispersal code.

In another aspect of the invention, a client device or other processing device separates a file into a plurality of blocks, forms an expanded set of blocks including the plurality of blocks and one or more additional blocks, and stores the blocks of the expanded set over a plurality of servers. The device then issues challenges to respective ones of the servers for each of multiple periods of time with each such period being of a specified length, and processes responses to the challenges to determine if a number of block corruptions exceeds a specified maximum number for any of the periods of time. The issued challenges have a characteristic determined at least in part based on one or more of the specified length of the periods of time and the specified maximum number of block corruptions. For example, the characteristic may include at least one of a minimum number of challenges to be issued within a given one of the periods of time and a minimum number of the stored blocks addressed by each of the challenges.

The illustrative embodiments advantageously overcome the above-noted drawbacks of conventional approaches to verification of file availability and integrity in cloud storage environments. For example, the HAIL approach provides adequate security against the previously-described mobile adversary that is capable of progressively attacking multiple storage providers over time.

These and other features and advantages of the present invention will become more readily apparent from the accompanying drawings and the following detailed description.

BRIEF DESCRIPTION OF THE DRAWINGS

FIG. 4 is a set of pseudocode for a security experiment undertaken by a mobile adversary in a security model of an illustrative embodiment.

DETAILED DESCRIPTION

The present invention will be described herein with reference to exemplary storage systems and associated client devices, servers and other processing devices. It is to be appreciated, however, that the invention is not restricted to use with the particular illustrative system and device configurations shown.

Figure 1:
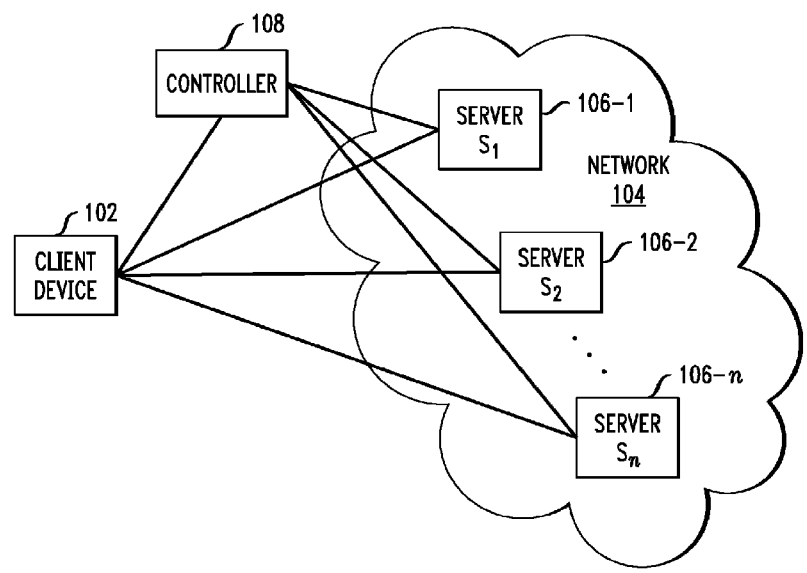
FIG. 1 is a block diagram showing one example of a distributed storage system in an illustrative embodiment of the invention.

FIG. 1 shows an example of a storage system 100 which includes a client device 102, a network 104, and servers 106-1, 106-2, . . . 106-n. The system is a distributed storage system in which a given file F is stored across multiple ones of the servers 106 using redundancy to support file recovery in the presence of server errors or failures. A more detailed example of this redundancy will be described below in conjunction with FIGS. 3A and 3B. A verifier associated with the client device 102 can check the integrity of F by processing portions of F retrieved from respective individual servers.

The client device 102 may be, for example, a desktop, laptop or palmtop personal computer, a mobile telephone, a personal digital assistant (PDA), a wireless email device, a workstation, a kiosk, a television set-top box, a game console, or more generally any type of information processing device from which a user or other verifier may wish to verify availability and integrity of a given file F stored in a distributed manner utilizing two or more of the n servers 106. The client device may also be referred to herein as simply a "client." The latter term is intended to be construed generally, so as to encompass the client device, a user of that device, or a combination of both of these entities.

A particular server 106 may be implemented as a computer or other stand-alone processing platform, or may be distributed over multiple processing platforms comprising multiple separate computers. The servers may be part of a single storage service or various subsets thereof may each be associated with independent storage services. Numerous other arrangements of multiple servers are possible in the storage system 100. The client device 102 and the servers 106 are examples of what are more generally referred to herein as "processing devices."

The client device 102 will generally include a user interface through which an associated user can interact with the system. This interaction allows the user to store files in a distributed manner using the servers 106, to verify availability and integrity of any such stored files, and to retrieve any such stored files.

The client device 102 may interact directly with the servers 106. Alternatively, a portion of the interaction between the client device and the servers may be carried out via an associated intermediary, illustratively shown in this embodiment as a controller 108.

The network 104, although illustratively shown as the Internet, may comprise, for example, a wide area network (WAN), a local area network (LAN), a satellite network, a telephone or cable network, or various portions or combinations of these and other types of networks.

The network 104 comprising servers 106 is an example of a type of arrangement commonly referred to as a "cloud." Distributed storage involving the n servers is representative of a cloud storage environment.

It is to be appreciated that a given embodiment of the system 100 may include multiple instances of client device 102, network 104 and server set 106, although only single instances of such components are shown in the simplified system diagram for clarity of illustration. For example, a given user may have multiple personal computing devices that access different sets of servers over different networks. The particular number of servers in a given such set of servers is arbitrary and may vary depending upon the application. For example, the server sets may all have different numbers of servers denoted $n_1$, $n_2$, $n_3$, and so on.

Figure 2:
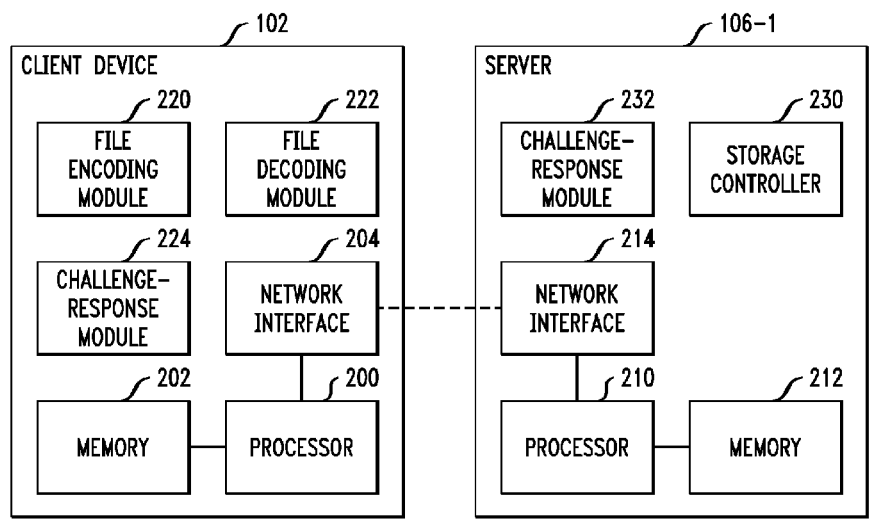
FIG. 2 is a more detailed view of the client device and a given one of the servers of the FIG. 1 system.

Referring now to FIG. 2, a more detailed illustrative implementation of client device 102 and a given server 106-1 is shown. The other servers 106-2 through 106-n are each assumed to be configured in substantially the same manner as server 106-1.

The client device 102 in this embodiment comprises a processor 200 coupled to a memory 202 and a network interface 204. Similarly, the server 106-1 comprises a processor 210 coupled to a memory 212 and a network interface 214. The client device and server communicate via their respective network interfaces, which may comprise conventional transceiver circuitry of a type well known to those skilled in the art. The processors 200 and 210 may comprise microprocessors, microcontrollers, application-specific integrated circuits (ASICs), field programmable gate arrays (FPGAs) or other types of processing circuitry, as well as portions or combinations of such circuitry elements.

The client device 102 further includes a file encoding module 220, a file decoding module 222, and a challenge-response module 224. The file encoding module 220 processes a given file F to generate multiple blocks that are stored across multiple ones of the servers 106 in the manner illustrated in FIGS. 3A and 3B. The file decoding module 222 processes blocks retrieved from the servers in order to recreate the original file F. The challenge-response module 224 implements a client portion of a challenge-response protocol through which the client device can interact with the servers 106 to verify availability and integrity of the given file F as stored across the servers. More particularly, the challenge-response module generates periodic challenges that are sent to respective ones of the servers, and processes the corresponding responses received back from the servers.

The server 106-1 comprises a storage controller 230 for directing storage of one or more blocks associated with the given file F into appropriate portions of the memory 212. The server further includes a challenge-response protocol module 232 for implementing the server portion of the challenge-response protocol. This module receives periodic challenges from the client device 102 and generates appropriate responses.

The modules 220, 222 and 224 of the client device 102 may be implemented in whole or in part in the form of one or more software programs stored in memory 202 and executed by processor 200. Similarly, the modules 230 and 232 of the server 106-1 may be implemented at least in part in the form of one or more software programs stored in memory 212 and executed by processor 210. The memories 202 and 212 may each be viewed as an example of what is more generally referred to herein as a "computer program product" having executable computer program code embodied therein. Such memories may comprise electronic memories such as random access memory (RAM), read-only memory (ROM) or other types of memory, in any combination. The computer program code when executed in a processing device such as client device 102 or server 106 causes the device to perform corresponding operations associated with functions such as encoding of files for storage across multiple servers, verification of availability and integrity of stored files, and decoding of stored files retrieved from the servers. One skilled in the art would be readily able to implement such software given the teachings provided herein. Other examples of computer program products embodying aspects of the invention may include, for example, optical or magnetic disks.

In alternative embodiments, one or more of the modules associated with the client device 102 or the server 106 may be implemented at least in part within a separate entity such as the controller 108.

The storage system 100 in an illustrative embodiment implements cryptographic functionality referred to herein as HAIL. In HAIL, a client distributes a file F with redundancy across n servers. As will be described, HAIL provides, among other advantages, enhanced security relative to that provided using conventional approaches. More specifically, HAIL provides reliance against a mobile adversary that can potentially corrupt all n of the servers, but can control only b out of the n servers within any given time step. We refer to a time step in this context as an "epoch."

In each epoch, the client or an associated entity such as controller 108 performs a number of checks to assess the integrity of F in the system, using the above-noted challenge-response protocol. If corruptions are detected on some servers, then F can be reconstituted from redundancy in intact servers and known faulty servers updated or replaced. Such periodic integrity checks and remediation are an important part of guaranteeing data availability against a mobile adversary: Without integrity checks, the adversary can corrupt all servers in turn across $\lceil n/b \rceil$ epochs and modify or purge F at will.

HAIL distributes blocks of the file F across the n servers using an encoding process that involves application of two different types of codes, referred to herein as server codes and dispersal codes. The file encoding process of HAIL in the present embodiment is carried out by file encoding module 220 of client device 102 and will be described below with reference to FIGS. 3A and 3B.

Let (n,l) be the parameters of the dispersal code. We assume for simplicity and clarity of description that this code is systematic, i.e., that it preserves l message blocks in their original form. Then l is the number of primary servers, those servers that store fragments of the original file F. The remaining n–l are secondary servers, or redundant servers, i.e., servers that maintain additional redundancy in the form of parity blocks used to help recover from failure.

Before transforming the file F into a distributed, encoded representation, we partition it into l distinct blocks or segments $F^{(1)}, \ldots, F^{(l)}$ and distribute these segments across the primary servers $S_1, \ldots, S_l$. An example of this partitioning of file F for l=3 is shown in FIG. 3A. The distributed cleartext representation of the file remains untouched by our subsequent encoding steps in this embodiment.

Figure 3B:
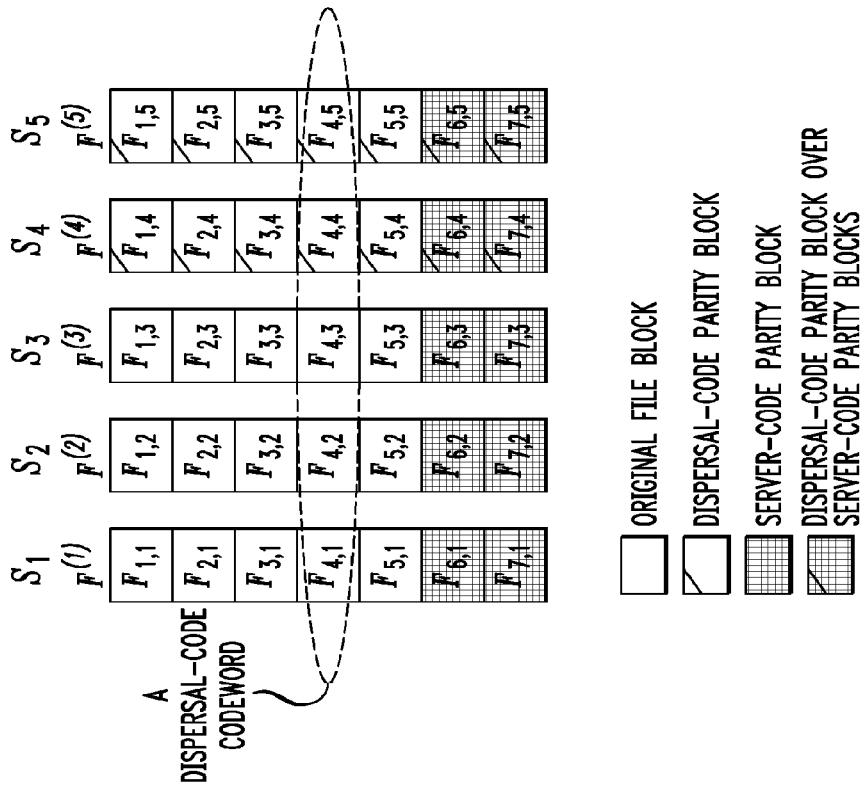
FIGS. 3A and 3B illustrate an exemplary technique for encoding a given file for distributed storage in the system of FIG. 1.
Figure 3A:
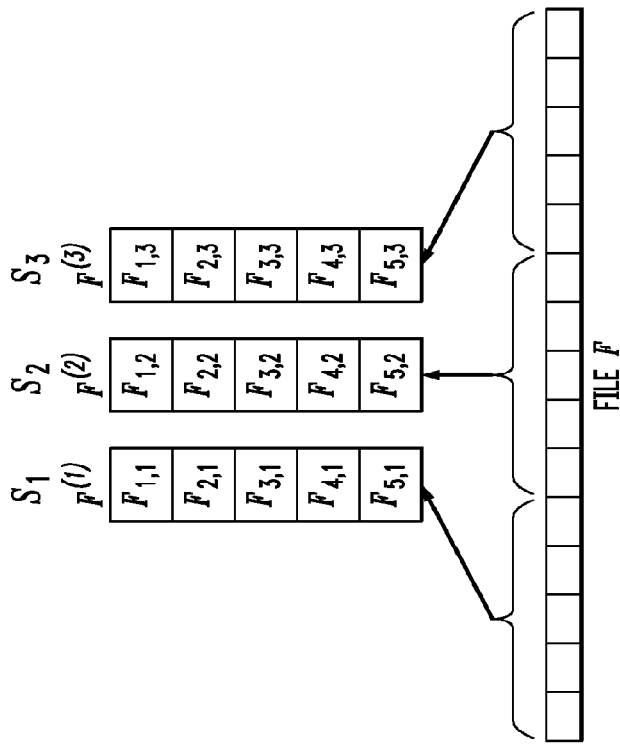

The partitioning may be viewed as producing a matrix of blocks of the original file, as illustrated in FIG. 3B.

We then encode each segment $F^{(j)}$ under the server code with error rate $\epsilon_c$. The effect of the server code is to extend the "columns" of the encoded matrix by adding parity blocks.

Next, we apply the dispersal code to create the parity blocks that reside on the secondary servers. It extends the "rows" of the encoded matrix across the full set of n servers $S_1, \ldots, S_n$. The resulting arrangement for l=3 and n=5 is shown in FIG. 3B.

With this encoding process, it is possible to use cross-server redundancy to check the integrity of F. The client or other verifier simply checks that the blocks in a given position, i.e., "row," constitute a valid codeword in the dispersal code. The overall storage cost associated with this encoding process is (n/l)|F|.

Use of a dispersal code does reduce the number of epochs T over which it is possible to ensure the integrity of F with high probability, relative to replication of F on each server with multiple-server POR. This is because the adversary can now corrupt a given "row" or dispersal codeword merely by corrupting at least (d−1)/2 blocks, where d is the minimum distance of the dispersal code. For an (n,l)-Reed-Solomon dispersal code, for instance, d=n−l+1. However, vulnerability to such "creeping-corruption" attacks is reduced considerably in the present embodiment through the use of cryptographic integrity checks. This improvement greatly extends the integrity lifetime T of the file F, at the expense of loss of public verifiability. That is, with a cryptographic integrity check in place, only the client that stored F can verify its integrity.

The cryptographic integrity checks in the present embodiment are implemented by embedding message authentication codes (MACs) in the parity blocks of the dispersal code. As we show below, both MACs and parity blocks can be based on a universal hash function (UHF). Consequently, it is possible to create a block that is simultaneously both a MAC and a parity block. By inserting MACs into each row of the encoded matrix, we are able to effectively verify the responses received from servers. This mechanism protects against creeping-corruption attacks because it does not just check that rows are self-consistent, but instead ensures that rows do not differ from their original values in F.

Another feature of HAIL involves aggregating responses from multiple servers. While the client could check individual blocks in the encoded file, a more efficient approach is to check multiple blocks of the file simultaneously. Accordingly, HAIL includes a mechanism to aggregate MACs across multiple blocks. The client can specify multiple positions in the file, and verify their correctness via a single, composite response from each server. For extra bandwidth savings, the client can specify positions implicitly using a pseudorandom seed.

More specifically, we use a linear code in HAIL called the aggregation code for combining responses from multiple servers in the challenge-response protocol. The aggregate response is a linear combination of rows of the encoded file matrix of the type shown in FIG. 3B, and is or approximates a codeword in the dispersal code. However, we need to ensure that by aggregating MAC values on individual blocks, we obtain a valid MAC. Accordingly, we define the concept of a composite MAC that, intuitively, guarantees that a MAC on a vector of blocks cannot be obtained unless all the MACs of individual vector components are known. Note that the aggregation code in HAIL carries zero storage overhead in that it can be computed in real time.

We will now describe the adversarial model in detail with reference to a security experiment undertaken by the adversary. The security experiment is shown in FIG. 4, and includes a test phase and a challenge phase.

We model HAIL as a set of n servers, $S_1, S_2, \ldots, S_n$, and a trusted, external entity $\mathcal{T}$. We assume authenticated, private channels between $\mathcal{T}$ and each server. In practice $\mathcal{T}$ may be a client or an external auditor or other associated entity. We assume known upper bounds on message delivery times in the network.

We consider an adversary $\mathcal{A}$ that is mobile, i.e., can corrupt a different set of b servers in each epoch, and is Byzantine, i.e., can behave arbitrarily. Obviously, meaningful file availability is not possible against a fully Byzantine adversary that controls all servers. Consequently, we assume that our adversary controls at most b servers in any given epoch. The adversary can of course move to a different set of corrupted servers in each epoch.

We regard each server $S_i$ as containing a distinct code base and storage system. The code base determines how the server replies to challenges; the storage system contains a potentially corrupted file segment.

At the beginning of each epoch, $\mathcal{A}$ may choose a fresh set of b servers and arbitrarily corrupt both their code bases and storage systems. At the end of an epoch, however, we assume that the code base of every server is restored to a correct state. From a theoretical perspective, this restoration models the limitation of the adversary to b servers. From a practical perspective, code-base restoration might reflect a malware-detection pass, software re-installation, invocation of a fresh virtual machine image, etc. Even when the code base of a server is restored, however, the adversary's corruptions to the server's storage system, i.e., storage file segment, remain.

Repair of servers' storage systems only happens when a client reactively invokes the redistribute function, to be described below, an expensive and generally rare event. Thus, while the adversary controls only b servers, it is possible for more than b servers to contain corrupted data in a given epoch. The aim of the client in HAIL is to detect and repair corruptions before they render a file F unavailable.

A time step or epoch in HAIL thus comprises three phases:
1. A corruption phase: The adversary $\mathcal{A}$ chooses a set of up to b servers to corrupt, where b is a security parameter.
2. A challenge phase: The trusted entity $\mathcal{T}$ challenges some or all of the servers.
3. A remediation phase: If $\mathcal{T}$ detects any corruptions in the challenge phase, it may modify/restore servers' file shares.

Let F denote the file distributed by $\mathcal{T}$. We let $F_t^{(i)}$ denote the file share held by server $S_i$ at the beginning of epoch t, i.e., prior to the corruption phase, and let $\hat{F}_t^{(i)}$ denote the file share held by $S_i$ after the corruption phase.

In this formal adversarial model, we configure HAIL to include the following functions:

keygen($1^\lambda$)→κ: The function keygen generates a key κ=(sk,pk) of size security parameter λ. (For symmetric-key systems, pk may be null.)

encode(κ,F,l,n,b)→$\{F_0^{(i)}\}_{i=1}^n$: The function encode encodes F as a set of file segments, where $F_0^{(i)}$ is the segment designated for server i. The encoding is designed to provide l-out-of-n redundancy across servers and to provide resilience against an adversary that can corrupt at most b servers in any time step.

decode(κ,t,$\{\hat{F}_t^{(i)}\}_{i=1}^n$)→F: The function decode recovers the original file F at time t from a set of file segments stored at different servers.

challenge(κ)→$\{C_i\}_{i=1}^n$: The function challenge generates a challenge value $C_i$ for each server i.

respond(i,$C_i$,$\hat{F}_t^{(i)}$)→$R_i$: The function respond generates response $R_i$ from the file fragment $\hat{F}_t^{(i)}$ stored at server i at time t to challenge $C_i$.

verify(κ,j,$\{C_i,R_i\}_{i=1}^n$)→{0,1}. The function verify checks whether the response of server j is valid, using the responses of all servers $R_1, \ldots, R_n$ to challenge set $C_1, \ldots, C_n$. It outputs a '1' bit if verification succeeds, and '0' otherwise. We assume for simplicity that verify is sound, i.e., returns 1 for any correct response.

redistribute(κ,t,$\{\hat{F}_t^{(i)}\}_{i=1}^n$)→$\{F_{t+1}^{(i)}\}_{i=1}^n \cup \bot$: The function redistribute is an interactive protocol that replaces the fragment $\hat{F}_t^{(i)}$ stored at server i with $F_{t+1}^{(i)}$. It implements a recreation and distribution of corrupted file segments, and outputs ⊥ if the file cannot be reconstructed. We leave the definition of redistribute as general as possible. The function may involve the client reconstructing segments from all servers, decoding F, and reinvoking encode.

The adversary $\mathcal{A}$ is assumed to be stateful and have access to oracles encode and verify; we assume that $\mathcal{A}$ respects the bound b on the number of permitted corruptions in a given epoch. Denote by π the system parameters (l,n,b,T,$\epsilon_q$,$n_q$).

$\mathcal{A}$ participates in the two-phase security experiment shown in FIG. 4. In the test phase, $\mathcal{A}$ outputs a file F, which is encoded and distributed to servers. The second phase is a challenge phase that runs for T time intervals. In each time interval, $\mathcal{A}$ is allowed to corrupt the code base and storage system of at most b out of the n servers. Each server is challenged $n_q$ times in each interval, and $\mathcal{A}$ responds to the challenges sent to the corrupted servers. If more than a fraction $\epsilon_q$ of a server's responses are incorrect, the redistribute algorithm is invoked.

After the experiment runs for T time intervals, a decoding of the file is attempted and the experiment outputs 1 if the file cannot be correctly recovered. We define the HAIL advantage of $\mathcal{A}$ as: $\text{Adv}\,\mathcal{A}^{HAIL}(\pi) = \text{Pr}[\text{Exp}\,\mathcal{A}^{HAIL}(\pi) = 1]$. We denote by $\text{Adv}^{HAIL}(\pi, q_1, q_2, t)$ the maximum advantage of all adversaries making $q_1$ queries to encode, $q_2$ queries to verify, and running in time at most t.

It should be noted that we could construct a stronger security model for HAIL in which the file could be extracted through the challenge-response protocol if decoding fails. However, the stronger model might only benefit extraction of file fragments for those b servers corrupted by an adversary in an epoch, since the other n−b servers are assumed to have a correct code base. Other alternative security models may also be used. The particular security model utilized in a given embodiment of the invention may therefore be selected based upon the security needs and other characteristics of the storage application.

The HAIL building blocks to be described include UHFs and Reed-Solomon codes, MACs obtained from UHFs, aggregating of MACs, integrity-protected error-correcting codes (IP-ECCs), and adversarial codes.

UHFs and Reed-Solomon codes will initially be described. Let I denote a field with operations (+,×). For example, in an exemplary implementation described below, we work with $GF[2^a]$ for a=256.

A UHF is an algebraic function $h: \mathcal{K} \times I^l \to I$ that compresses a message or file element $m \in I^l$ into a compact digest or "hash" based on a key $\kappa \in \mathcal{K}$. We denote the output of h as $h_\kappa(m)$. A UHF has the property that given two inputs $x \neq y$, with overwhelming probability over keys $\kappa$, it is the case that $h_\kappa(x) \neq h_\kappa(y)$. In other words, a UHF is collision-resistant when the message pair (x,y) is selected independently of the key $\kappa$. A related notion is that of almost exclusive-or universal (AXU) hash functions that have the property that given three input messages, the probability that the XOR of the hashes of the first two inputs matches the third input is small. Formally, h is an $\epsilon$-universal hash function family if for any $x \neq y \in I^l$: $\text{Pr}_{\kappa \leftarrow \mathcal{K}}[h_\kappa(x) = h_\kappa(y)] \leq \epsilon$, and h is an $\epsilon$-AXU family if for any $x \neq y \in I^l$ and for any $z \in I$: $\text{Pr}_{\kappa \leftarrow \mathcal{K}}[h_\kappa(x) \oplus h_\kappa(y) = z] \leq \epsilon$.

Many common UHFs are also linear, meaning that for any message pair $(m_1, m_2)$, it is the case that $h_\kappa(m_1) + h_{78}(m_2) = h_\kappa(m_1 + m_2)$. In fact, it is possible to construct a UHF based on a linear ECC. An (n,l,d) ECC encodes messages of length l into codewords of size n such that the minimum distance between any two codewords is d. An (n,l,d) code can correct up to d−1 errors and $$\left\lfloor \frac{d-1}{2} \right\rfloor$$

erasures.

For example, a UHF may be based on a (n,l,d=n−l+1)-Reed-Solomon code over I. Let $\vec{m} = (m_1, m_2, \ldots, m_l)$, where $m_i \in I$. $\vec{m}$ may be viewed in terms of a polynomial representation of the form $p_{\vec{m}}(x) = m_l x^{l-1} + m_{l-1} x^{l-2} + \ldots + m_1$. A Reed-Solomon code, then, may be defined in terms of a fixed vector $\vec{a} = (a_1, \ldots, a_n)$. The codeword of a message $\vec{m}$ is the evaluation of polynomial $p_{\vec{m}}$ at points $(a_1, \ldots, a_n)$: $(p_{\vec{m}}(a_1), p_{\vec{m}}(a_2), \ldots, p_{\vec{m}}(a_n))$.

A UHF of interest, then, is simply $h_\kappa(m) = p_{\vec{m}}(\kappa)$ with key space $\mathcal{K} = I$. It is well known that this construction, which we refer to as RS-UHF (but is typically referred as the polynomial evaluation UHF), is indeed a good UHF. More particularly, RS-UHF is a $$\frac{l-1}{2^a} - \text{universal hash family}$$

(and, as such, a $$\frac{l-1}{2^a} - AXU \text{ family}).$$

A UHF, however, is not a cryptographically secure primitive. That is, it is not generally collision-resistant against an adversary that can choose messages after selection of $\kappa$. Given a digest $y = h_\kappa(m)$, an adversary may be able to construct a new message m' such that $h_\kappa(m') = y$. Thus a UHF is not in general a secure MAC. A MAC is formally defined as follows:

Assume a MAC MA=(MGen,MTag,MVer) is given by three algorithms: $\kappa \leftarrow \text{MGen}(1^\lambda)$ generates a secret key given a security parameter; $\tau \leftarrow \text{MTag}_\kappa(m)$ computes a MAC on a message m with key $\kappa$; and $\text{MVer}_\kappa(m, \tau)$ outputs 1 if $\tau$ is a valid MAC on m, and 0 otherwise. Consider an adversary $\mathcal{A}$ with access to the MTag and MVer oracles, whose goal is to output a valid MAC on a message not queried to MTag. We define:

$$Adv_{MA}^{uf-mac}(A) =$$

$$Pr\left[\kappa \leftarrow MGen(1^\lambda); (m, \tau) \leftarrow A^{MTag_\kappa(\cdot), MVer_\kappa(\cdot, \cdot)} : MVer_\kappa(m, \tau) = 1 \wedge m \text{ not queried to } MTag_\kappa(\cdot)\right].$$

We denote by $\text{Adv}_{MA}^{uf-mac}(q_1, q_2, t)$ the maximum advantage of all adversaries making $q_1$ queries to MTag, $q_2$ queries to CMVer and running in time at most t.

It is well known that a MAC may be constructed as the straightforward composition of a UHF with a pseudorandom function (PRF). A PRF is a keyed family of functions $g: \mathcal{K}_{PRF} \times D \to R$ that maps messages from domain D to range R such that, intuitively, a particular function from the PRF family is indistinguishable from a true random function from D to R.

More formally, consider an adversary $\mathcal{A}$ that participates in two experiments: one in which the adversary has access to a function chosen randomly from PRF family g and the second in which the adversary has access to a random function from D to R. The goal of the adversary is to distinguish the two worlds: the adversary outputs 1 if it believes the oracle is a function from the PRF family, and 0 otherwise.

We define the prf-advantage of $\mathcal{A}$ for PRF family g as $\text{Adv}_g^{prf}(\mathcal{A}) = |\text{Pr}[\kappa \leftarrow \mathcal{K}_{PRF}: \mathcal{A}^{g_\kappa(\cdot)} = 1] - \text{Pr}[f \leftarrow \mathcal{F}^{D \to R}: \mathcal{A}^{f(\cdot)} = 1]|$, where $\mathcal{F}^{D \to R}$ is the set of all functions from D to R. We denote by $\text{Adv}_g^{prf}(q, t)$ the maximum prf-advantage of an adversary making q queries to its oracle and running in time t.

Given a UHF family $h: \mathcal{K}_{UHF} \times I^l \to I$ and a PRF family $g: \mathcal{K}_{PRF} \times \mathcal{L} \to I$, we construct the MAC UMAC=(UGen, UTag,UVer) such as: UGen($1^\lambda$) generates key ($\kappa, \kappa'$) uniformly at random from $\mathcal{K}_{UHF} \times \mathcal{K}_{PRF}$; UTag: $\mathcal{K}_{UHF} \times \mathcal{K}_{PRF} \times I^l \to \mathcal{L} \times I$ is defined as $\text{UTag}_{\kappa, \kappa'}(m) = (r, h_\kappa$ (m)+$g_{\kappa'}$(r)); UVer: $\mathcal{K}_{UHF} \times \mathcal{K}_{PRF} \times I^l \times \mathcal{L} \times I$ is defined as $UVer_{\kappa,\kappa'}(m,(c_1,c_2))=1$ if and only if $h_\kappa(m)+g_{\kappa'}(c_1)=c_2$. The tagging algorithm of UMAC outputs, in addition to the composition of UHF and PRF, a unique counter $r \in \mathcal{L}$ that is incremented by the algorithm at each invocation. Thus, the MAC algorithm is stateful and its properties are as follows: Assume that h is an $\epsilon^{UHF}$-AXU family of hash functions and g is a PRF family. Then UMAC is a stateful MAC with advantage: $Adv_{UMAC}^{uf-mac}(q_1,q_2,t) \leq Adv_g^{prf}(q_1+q_2, t)+\epsilon^{UHF}q_2$.

For the composition of a UHF and PRF to be a MAC, it is important that the nonces used as input into the PRF be unique. As apparent from the foregoing definition, one possible approach is to make the MAC algorithm stateful and use a counter incremented at each operation as the nonce into the PRF. Alternatively, the nonce input to the PRF may be a hash of the file name and the block offset in the file, instead of a strictly monotonic counter.

As mentioned previously, HAIL is configured to aggregate MACs on individual file blocks into a MAC on a vector of blocks. We show below how we can generically compose tags computed with the same MAC algorithm. The definition of composite MAC here applies to any MAC that outputs tags in a field, not just the UMAC construction.

Let $MTag: \mathcal{K} \times J \to N$ be the tagging algorithm of a MAC $MA=(MGen,MTag,MVer)$ defined on messages from field J that outputs tags in a field N. Let $\vec{M}=(m_1, \ldots, m_v) \in J^v$ be a vector of messages and let $\vec{A}=(a_1, \ldots, a_v) \in J^v$ be a vector of scalar values with $a_i \neq 0$. We define $\tau=\Sigma_{i=1}^v a_i MTag_\kappa(m_i)$ as the composite MAC of $\vec{M}$ for coefficients $a_1, \ldots, a_v$. If $\tau$ is a valid composite MAC of $\{m_i\}_{i=1}^v$ for coefficients $\{a_i\}_{i=1}^v$, the composite MAC verification algorithm $CMVer_\kappa(\{m_i,a_i\}_{i=1}^v,\tau)$ outputs 1.

Consider an adversary that has access to MTag and CMVer oracles. Intuitively, a composite MAC has the property that the adversary can generate a vector of messages and a composite MAC with small probability if it does not query the MTag oracle for all component messages of the vector.

We give a formal definition of composite MACs as follows. Let $MA=(MGen,MTag,MVer)$ be a MAC algorithm and CMVer the composite MAC verification algorithm defined above. Consider an adversary $\mathcal{A}$ with access to MTag and CMVer oracles whose goal is to output a set of messages $m_1, \ldots, m_v$, a set of coefficients $a_1, \ldots, a_v$ and a composite MAC $\tau$. We define:

$$Adv_{MA}^{c-mac}(\mathcal{A})=Pr[\kappa \leftarrow MGen(1^\lambda);(\{m_i,a_i\}_{i=1}^v,\tau) \leftarrow \mathcal{A}^{MTag_\kappa(\cdot),CMVer_\kappa(\cdot,\cdot)}: CMVer_\kappa(\{m_i,a_i\}_{i=1}^v,\tau)=1 \wedge \exists i \in [1,v]$$

for which $m_i$ was not queried to $MTag_\kappa(\cdot)$].

We denote by $Adv_{MA}^{c-mac}(q_1,q_2,t)$ the maximum success probability of all adversaries making $q_1$ queries to MTag, $q_2$ queries to CMVer and running in time t.

It can be shown that, given a MAC MA on field J, MA extended to $J^v$ as above is a composite MAC with advantage:

$$Adv_{MA}^{c-mac}(q_1,q_2,t) \leq v Adv_{MA}^{uf-mac}(q_1+vq_2+v-1, 0,(v+1)t).$$

Sometimes we do not have access to all messages $\{m_i\}_{i=1}^v$ to check a composite MAC. We define a linear composite MAC algorithm to be such that a composite MAC can be verified from a linear combination of messages: $\vec{m}=\Sigma_{i=1}^v a_i m_i$.

A composite MAC is defined as linear if there exists an algorithm CMVer-Lin such that $CMVer_\kappa(\{m_i,a_i\}_{i=1}^v,\tau)=1$ if and only if $CMVer-Lin_\kappa(\Sigma_{i=1}^v a_i m_i,\tau)=1$.

It can be shown that if the nonce values $r_i$ input to the PRF in the UMAC construction are known, the composite MAC defined from UMAC is linear.

Typically, a MAC is appended to a message. The above-noted IP-ECC is a cryptographic primitive that acts both as a MAC and an ECC, as will now be described. We leverage the redundancy added by the ECC for constructing the MAC. Such a primitive allows efficient checking of server responses in HAIL.

For $n \geq 1$, we define an (n,l,d)-integrity-protected ECC (denoted IP-ECC) as a tuple of algorithms IC=(KGenECC, MTagECC,MVerECC) such that:

KGenECC($1^\lambda$) selects a random key $\kappa$ from key space $\mathcal{K}$;

MTagECC: $\mathcal{K} \times I^l \to I^n$ takes as input a secret key $\kappa$ and a message m in $I^l$, and outputs an integrity-protected codeword c in space $I^n$ that acts as an encoding of m, and contains an integrity tag for m.

MVerECC: $\mathcal{K} \times I^n \to (\{I^l \cup \perp\},\{0,1\})$ takes as input a secret key $\kappa$ and an integrity-protected codeword c in $I^n$ and outputs a message $m \in I^l$ (or $\perp$ upon decoding failure), as well as a one-bit with value 1 if c contains a valid integrity tag on m, and 0 otherwise.

Consider an adversary $\mathcal{A}$ with access to the $MTagECC_\kappa(\cdot)$ and $MVerECC_\kappa(\cdot)$ oracles, whose goal is to output a codeword c such that $MVerECC_\kappa(c)=(m,1)$ and m was not queried to $MTagECC_\kappa(\cdot)$. We define:

$$Adv_{IC}^{uf-ecc}(\mathcal{A})=Pr[\kappa \leftarrow KGenECC(1^\lambda);$$
$$c \leftarrow \mathcal{A}^{MTagECC_\kappa(\cdot),MVerECC_\kappa(\cdot)}:MVerECC_\kappa(c)=(m,1) \wedge m$$

not queried to $MTagECC_\kappa(\cdot)$].

We denote by $Adv_{IC}^{uf-ecc}(q_1,q_2,t)$ the maximum advantage of all adversaries making $q_1$ queries to MTagECC, $q_2$ queries to MVerECC and running in time at most t.

We give now a construction of an IP-ECC code based on a (n,l,n-l+1) Reed-Solomon code, called $ECC_d$. Intuitively, to tag a message, we encode it under the Reed-Solomon code, and then apply a PRF to the last s code symbols (for $1 \leq s \leq n$ a parameter in the system), effectively obtaining a MAC on each of those s code symbols using the UMAC construction. A codeword is considered valid if one or more of its last s symbols are valid MACs under UMAC on its decoding m.

More specifically, the IP-ECC (n,l,d) code construction is defined as:

KGenECC($1^\lambda$) selects keys $\vec{\kappa}=\{\{\kappa_i\}_{i=1}^n,\{\kappa'_i\}_{i=n-s+1}^n\}$ at random from space $\mathcal{K}=I^n \times (\mathcal{K}_{PRF})^s$. The security parameter $\lambda$ specifies the size of I, as well as the length of the keys in $\mathcal{K}_{PRF}$. The keys $\{\kappa_i\}_{i=1}^n$ define a Reed-Solomon code as described above, i.e., they define the points at which polynomials are evaluated when constructing a codeword. The keys $\{\kappa'_i\}_{i=n-s+1}^n$ are used as PRF keys in the UMAC construction.

$MTagECC_\kappa(m_1, \ldots, m_l)$ outputs $(c_1, \ldots, c_n)$, where $c_i=RS-UHF_{\kappa_i}(\vec{m}),i=[1,n-s]$ and $c_i=UTag^\kappa_{\kappa_i,\kappa'_i}(m_1, \ldots, m_l)=(r_i,RS-UHF_{\kappa_i}(\vec{m})+g_{\kappa'_i}(r_i)),i=[n-s+1,n]$. We define d to be the minimum Hamming distance between two codewords output by MTagECC.

$MVerECC_\kappa(c_1, \ldots, c_n)$ first strips off the PRF from $c_{n-s+1}, \ldots, c_n$ as: $c'_i=c_i-g_{\kappa'_i}(r_i),i=[n-s+1,n]$, and then decodes $(c_1, \ldots, c_{n-s},c'_{n-s+1}, \ldots, c'_n)$ using the decoding algorithm of Reed-Solomon codes to obtain message $\vec{m}=(m_1, \ldots, m_l)$. If the decoding algorithm of the Reed-Solomon code defined by points $\{\kappa_i\}_{i=1}^n$ fails, then the MVerECC algorithm outputs $(\perp,0)$, where we assume that the decoding algorithm of Reed-Solomon codes fails if the number of corruptions in a codeword is beyond $$\left\lfloor \frac{d-1}{2} \right\rfloor.$$

If one of the last s symbols of $(c_1, \ldots, c_n)$ is a valid MAC on $\vec{m}$ under UMAC, the MVerECC algorithm outputs $(\vec{m},1)$; otherwise it outputs $(\vec{m},0)$.

The MVerECC algorithm in the above construction needs at least one correct MAC block in order to decode and verify the message correctly. This implies that, even if the minimum distance of the underlying code is $d=n-l+1$, the construction is resilient to at most $E-1$ erasures, and $$\left\lfloor \frac{E-1}{2} \right\rfloor$$

errors, for $E=\min(d,s)$.

It can be shown that if RS-UHF is constructed from a $(n,l,n-l+1)$-Reed-Solomon code and g is a PRF family, then the IP-ECC code $ECC_d$ defined above has the following advantage:

$$Adv_{ECC_d}^{uf-ecc}(q_1,q_2,t) \leq 2[Adv_{UMAC}^{uf-mac}(q_1,q_2,t)].$$

The techniques described above for aggregating MACs, i.e., for composite MAC verification, apply in a natural way to IP-ECC codes. Consider the linear combination of IP-ECC codewords as a composite codeword $\vec{c}_1, \ldots, \vec{c}_v$ as a composite codewrod $\vec{c} = \Sigma_{i=1}^{v} a_i \vec{c}_i$. Implicit in $\vec{c}$ are composite MACs, i.e., linear combinations of MACs from the individual, contributing codewords. So we can apply MVerECC directly to $\vec{c}$, thereby verifying the correctness of $\vec{c}_1, \ldots, \vec{c}_v$.

As indicated previously, the dispersal codes are assumed to be systematic. In a systematic code, the codeword for a message contains the message in clear followed by parity blocks. The Reed-Solomon codes obtained through polynomial evaluation are, in general, not systematic. However, it is possible to offer a different view of Reed-Solomon encoding that is, in fact, systematic. The codebook for a Reed-Solomon code specified by vector $\vec{a}=(a_1, \ldots, a_n)$ consists of all polynomials of degree $l-1$ evaluated on each of the points of $\vec{a}$: $C_{RS} = \{(f(a_1), \ldots, f(a_n)) | \deg(f) \leq l-1\}$. A systematic code is one in which a message is mapped to a codeword whose first $l$ symbols match the message. Given a message $\vec{m}=(m_1, \ldots, m_l)$, a polynomial f of degree $l-1$ for which $f(a_i)=m_i, i=[1,l]$ can be determined by solving a linear system.

The IP-ECC construction can be adapted for systematic Reed-Solomon codes as follows: we encode a message under a systematic code, and then apply the PRF only to the parity blocks. The results above still hold for this systematic encoding for $s=n-l$. We employ this systematic code that can recover from $n-l-1$ erasures and $$\left\lfloor \frac{n-l-1}{2} \right\rfloor$$

errors in the present embodiment of HAIL.

The server code in the present embodiment of HAIL uses an adversarial ECC. Adversarial ECCs are codes resistant to a large fraction of adversarial corruptions. While a standard ECC is designed to provide information-theoretic properties, an adversarial ECC uses cryptography to achieve otherwise inefficient or impossible levels of resilience against a computationally bounded adversary. An $(n,l,d)$-ECC corrects up to $$\left\lfloor \frac{d-1}{2} \right\rfloor$$

errors, and thus it supports a fraction of $$\frac{d-1}{2n}$$

adversarial corruption. Examples of adversarial codes based on cryptographically protected, striped Reed-Solomon codes are described in K. Bowers et al., "Proofs of retrievability: Theory and implementation," 2008. In their construction, a file is permuted first with a secret key and then divided into stripes. Parity blocks are computed for each stripe and appended to the unmodified file. To hide stripe boundaries, parity blocks are encrypted and permuted with another secret key. The encoding of the file consists of the original file followed by the permuted and encrypted parity blocks, and is systematic.

The adversarial ECC used as the server code in HAIL is more particularly defined as follows. An $(n,l,d)$-adversarial ECC AECC consists of a public key space $\mathcal{K}_{PK}$, private key space $\mathcal{K}_{SK}$, an alphabet $\Sigma$, and a triple of functions: (1) a probabilistic function $\text{KGenECC}(1^\lambda) \to (pk,sk) \in \mathcal{K}_{PK} \times \mathcal{K}_{SK}$; (2) a function Encode: $\mathcal{K}_{PK} \times \mathcal{K}_{SK} \times \Sigma^l \to \Sigma^n$; and (3) a function Decode: $\mathcal{K}_{PK} \times \mathcal{K}_{SK} \times \Sigma^n \to \{\Sigma^l \cup \bot\}$.

While Encode and Decode may be deterministic or probabilistic, we assume for our purposes that they are deterministic. A secret-key ECC is one in which $\mathcal{K}_{PK} = \phi$. We shall consider only secret-key ECCs here.

Consider an adversary $\mathcal{A}$ with access to the Encode and Decode oracles, whose goal is to output a pair of codewords at small Hamming distance that decode to different messages. We define the advantage of $\mathcal{A}$ as follows.

Let $\text{Adv}\mathcal{A}_{AECC}(\rho,\delta)=\Pr[\kappa \leftarrow \text{KGenECC}(1^\lambda); (c,c') \leftarrow \mathcal{A}^{Decode_\kappa(\cdot),Encode_\kappa(\cdot)}$:

$\text{Decode}_\kappa(c) \neq \text{Decode}_\kappa(c') \wedge \text{Decode}_\kappa(c') \neq \bot] - \delta$, where $\mathcal{A}$ outputs $(c,c') \in (\Sigma^n, \Sigma^n)$ such that: (1) c is the output of an oracle call $\text{Encode}_\kappa(\bullet)$ (c is a valid codeword) and (2) $|c-c'| \leq \rho n$.

The definition can be easily extended to erasure codes. It is easy to show that an $(n,l,d)$-ECC that is an $(\rho,\delta)$-adversarial ECC with $$\rho \leq \frac{d-1}{2n},$$

is also a $(2\rho, \delta)$-adversarial erasure code.

Using the technical building blocks defined above, we will now provide additional details of HAIL in the present embodiment.

As indicated above, we let l be the number of primary servers, and n the total number of servers. The client generates the following sets of keys:

Dispersal-code keys: These are $n-l$ pairs of keys $\{\kappa_j, \kappa'_j\}_{j=[l+1,n]}$, where $\kappa_j$ and $\kappa'_j$ are secret keys for the UHF and for the PRF in the UMAC construction, respectively;

Server-code keys: These are generated via the algorithm KGenECC, described above; and Challenge/aggregation keys: These are keys used to generate challenges, and are applied to seed inputs to the aggregation code for responses. These keys can be generated from a master secret key that the client stores locally.

The encoding of files in the HAIL protocol has been depicted graphically in FIGS. 3A and 3B. We aim at obtaining a distributed, systematic encoding $F_d$ of a file F. First, we partition F into l distinct segments $F^{(1)}, \ldots, F^{(l)}$ and distribute these segments across the primary servers $S_1, \ldots, S_l$ respectively. This distributed cleartext representation of the file remains untouched by our subsequent encoding steps.

We then encode each segment $F^{(j)}$ under the server code, implementing using the adversarial code described above, to protect against small corruption at each server. The effect of the server code is to extend the "columns" of $F_d$ by adding parity blocks. Next, we apply the dispersal code to create the parity blocks that reside on the secondary servers $S_{l+1}, \ldots, S_n$. It extends the "rows" of $F_d$ across the full set of n servers. The dispersal code and server code commute, so we can swap these two encoding steps, if desired. The dispersal code in this embodiment is an IP-ECC as described previously, and includes PRF values on the parity blocks for each row, i.e., on the blocks contained in secondary servers $S_{l+1}, \ldots, S_n$. Viewed another way, we "encrypt" columns l+1 through n, thereby turning them into cryptographic MAC values.

Finally, we compute a MAC over the full file F, and store this MAC value on one or more of the servers. This full-file MAC allows the client to confirm when it has successfully downloaded the file F.

The steps of encode are detailed below:

1. [File partitioning] Partition the file into l segments and store segment $F^{(j)}$ on server j, for j=[1,l]. Denote by $m_F = |F|/l$ the number of symbols in each segment. We have thus obtained a $(m_F, l)$ matrix $\{F_{ij}\}_{i=[1,m_F], j=[1,l]}$ containing the original file blocks.

2. [Server code application] Encode each file segment $F^{(j)}$ under the server systematic server code (viewed as an erasure code), and obtain a segment of m blocks at each server (where blocks $m_F+1, \ldots, m$ are parity blocks for the server code).

3. [Dispersal code application] Apply the systematic dispersal code $ECC_d$ to the rows of the encoded matrix obtained in step 2. We determine thus the segments $F^{(l+1)}, \ldots, F^{(n)}$.

If we denote by $F_d = \{F_{ij}^d\}_{i=[1,m], j=[1,n]}$ the encoded representation of F at the end of this step, then $F_{ij}^d = F_{ij}$ (i.e., block i in $F^{(j)}$), for i=[1, $m_F$],j=[1,l]. $F_{ij}^d$ for i=[$m_F$+1m],j=[1,l] are the parity blocks under the server code. The columns l+1, ..., n are obtained through the application of the $ECC_d$ construction to columns 1, ..., l as follows: $F_{ij}^d = RS-UHF_{\kappa j}$ $(F_{i1} \ldots F_{il}) + g_{\kappa'_j}(\tau_{ij})$, for i=[1,m],j=[l+1,n]. $\tau_{ij}$ is a position index that depends on the file handle, as well as the block index i and the server position j, e.g., hash of the file name concatenated with i and j.

4. [Whole-file MAC computation] Lastly, a cryptographic MAC of the file (and its handle) is computed and stored with the file.

The initial share at time 0 for each server $S_j$ is $F_0^{(j)} = \{F_{ij}^d\}_{i=[1,m]}$.

For decoding the encoded matrix, we proceed in two steps. First, we decode each row of the matrix and check the MACs embedded into the parity blocks of the dispersal code. If a row cannot be correctly decoded or if none of the MACs in the parity blocks of a row verifies, then we mark all blocks in that row as erasures. In the second step, we apply the server code to each column and try to recover from the erasures in the first step. If the number of erasures exceeds the correction capability of the server code, then decoding fails.

Since the exact positions of erasures are known from the first level of decoding, the adversarial server code can be an erasure code. The dispersal code can be either an erasure code or an ECC. However, each choice imposes a different requirement on the maximum number b of corrupted servers in an epoch. We present decoding algorithms for both cases.

The details of the algorithm to recover the original file from the encoded matrix $F_d$ are as follows:

Decode rows from the dispersal code. As discussed above, we consider two cases:

If the dispersal code is an ECC, then up to $$\left\lfloor \frac{n-l-1}{2} \right\rfloor$$

errors can be corrected in each row. This choice imposes the requirement that the number of servers corrupted in each epoch be bounded by $$b \leq \left\lfloor \frac{n-l-1}{2} \right\rfloor.$$

Otherwise, the adversary could corrupt all rows in an epoch, obliterating F.

If the dispersal code is an erasure code, then a mechanism for determining the positions of errors in a row is needed. We can find erroneous blocks using the embedded MACs on the parity blocks, as long as at least one of the MACs in the parity blocks is valid. This approach requires brute force: We consider in turn each MAC block to be valid, try all sets of l blocks in the codeword (among the n−1 remaining blocks), until we find a decoding for which the MAC block is valid. The brute force approach can recover from n−l−1 erasures, and thus we impose b≤n−l−1.

Using an erasure code instead of an ECC for $ECC_d$ requires fewer secondary servers. The required brute-force decoding, though, is asymptotically inefficient, since (n−l)

$$\binom{n-1}{l}$$

combinations of blocks have to be examined. We recommend use of an erasure code for $ECC_d$ for small values of n (e.g., n<10), and an ECC for larger values of n. In the remainder of the description, we assume that the dispersal code is an ECC.

Decode columns from the server code. The blocks in the rows that cannot be reconstructed from the dispersal code are marked as erasures in the matrix. The server code is then applied to each column to recover those erasures. If one of the columns stored at the primary servers cannot be recovered, then decoding fails.

HAIL utilizes a challenge-response protocol in which the client verifies the correctness of a random subset of rows $D = i_1, \ldots, i_v$ in the encoded matrix. The client's challenge consists of a seed $\kappa_c$ from which each server derives set D, as well as a value $u \in I$.

Each server $S_j$ returns a linear combination of the blocks in the row positions of D, denoted by $R_j$. To aggregate server responses, we use an aggregation code $ECC_a$ with message size v, implemented also with a Reed-Solomon code. $R_j$ is computed as the $u^{th}$ symbol in $ECC_a$ across the selected rows. The responses of all servers $(R_1, \ldots, R_n)$ then represent a linear combination of rows $i_1, \ldots, i_v$ with coefficients $a_i = u^{i-1}, i=[1,v]$.

Intuitively here, because all servers operate over the same subset of rows D, the sequence $R=(R_1, \ldots, R_n)$ is itself a codeword in the dispersal code, with aggregate PRF pads "layered" onto the responses $R_{l+1}, \ldots, R_n$ of the parity servers. Thanks to our IP-ECC dispersal code and our techniques of aggregating several MACs into a composite MAC as described above, the client can check the validity of the combined response $\vec{R}$, by decoding to a message $\vec{m}$ and checking that at least one of the composite responses of the secondary servers is a valid composite MAC on $\vec{m}$. Having done so, the client can then check the validity of each individual response $R_j$: $R_j$ is a valid response for a primary server if it matches the j-th symbol in $\vec{m}$; for a secondary server, $R_j$ is a valid response if it is a valid MAC on $\vec{m}$.

The challenge-response protocol is described below:
1. The client sends a challenge $\kappa_c$ to all servers.
2. Upon receiving challenge $\kappa_c$, server $S_j$ derives set $D = \{i_1, \ldots, i_v\}$, as well as a value $u \in I$. The response of server $S_j$ is $R_j = RS\text{-}UHF_u(F_{i_1,j}^d, \ldots, F_{i_v,j}^d)$.
3. The client calls the linear composite MVerECC algorithm of the dispersal code on $(R_1, \ldots, R_n)$. If the algorithm outputs $(\vec{m},0)$ or $(\perp,0)$, then verification of the response fails and verify$(\kappa,j,\{\kappa_c,R_i\}_{i=1}^n)$ returns 0 for all j.
4. Otherwise, let $(\vec{m},1)$ be the output of the composite MVerECC algorithm. Algorithm verify$(\kappa,j,\{\kappa_c,R_i\}_{i=1}^n)$ returns 1 if:
  $m_j = R_j$, for $j \in [1,l]$; or
  $R_j$ is a valid composite MAC on $\vec{m}$ under UMAC with keys $(\kappa_j, \kappa'_j)$ and coefficients $\{a_i\}_{i=1}^v$, for $j \in [l+1,n]$.

The redistribution of shares in HAIL will now be described. HAIL runs for a number of epochs T. In each epoch the client issues $n_q$ challenges to all servers and verifies their responses. The client monitors all servers in each epoch, and if the fraction of corrupted challenges in at least one server exceeds a threshold $\epsilon_q$, the redistribute algorithm is called.

In the redistribute algorithm, the client downloads the file shares of all servers, and applies the decoding algorithm described above. Once the client decodes the original file, it can reconstruct the shares of the corrupted servers as in the original encoding algorithm. The new shares are redistributed to the corrupted servers at the beginning of the next time interval t+1, after the corruption has been removed through a reboot or alternative mechanism. Shares for the servers that have correct shares remain unchanged for time t+1. Alternative redistribute algorithms can be used in other embodiments.

We define the HAIL system to be available if the security experiment from FIG. 4 outputs 0; otherwise we say that the HAIL system is unavailable. HAIL becomes unavailable if the file cannot be recovered either when a redistribute is called or at the end of the experiment. In the following description, we give bounds for HAIL availability and show how to choose parameters in HAIL for given availability targets.

There are several factors that contribute to HAIL availability. First is the redundancy embedded in each server through the server code; it enables recovery from a certain fraction of corruption at each server. Second is the frequency with which the client challenges each server in an epoch; this determines the probability of detecting a corruption level uncorrectable by the server code of an individual server. Third, the redundancy embedded in the dispersal code enables file recovery even if a certain threshold of servers is corrupted.

Let $(n_s, l_s, d_s = n_s - l_s + 1)$ be the parameters of the Reed-Solomon code used to encode stripes in the adversarial server code described above. The advantage of this erasure code may be specified as follows: If the block corruption level at a server is $$\epsilon_c \leq \frac{d_s - 1}{2n_s}$$

and the size of a file segment stored at each server is m, then the server erasure code has advantage $Adv_{AECC}(\epsilon_c, \gamma)$, for $$\gamma = \left\lceil \frac{m}{n_s} \right\rceil e^{d_s - 1 - 2\epsilon_c n_s} \left(\frac{d_s - 1}{2\epsilon_c n_s}\right)^{1 - d_s}.$$

In HAIL, $n_q$ challenges are issued by the client in an epoch. A redistribute operation is triggered if at least one of the servers replies incorrectly to more than a $\epsilon_q$-fraction of challenges.

Recall that at least n−b servers have a correct code base in a time interval, but might have corruptions in their storage system. We refer to these corruptions as residual, in that they were "left behind" by $\mathcal{A}$. We are interested in detecting servers whose residual corruptions exceed the correction level tolerated by the server code (denoted $\epsilon_c$).

Given a $\epsilon_c$-fraction of residual corrupted blocks from a server's fragment, we can compute a lower bound on the fraction of challenges that contain at least one incorrect block, denoted $\epsilon_{q,c}$. Based on $\epsilon_{q,c}$, we can then determine a threshold $\epsilon_q$ at which the client considers the server fragment corrupted and calls the redistribute algorithm. After we choose the detection threshold $\epsilon_q$, we estimate the probability $p_n$ that we fail to detect corruption of at least a $\epsilon_c$-fraction of blocks.

If a server's fragment contains a fraction $\epsilon_c$ of corrupted blocks and the server code base is correct, then the fraction of challenges containing a corrupted block is $$\epsilon_{q,c} = 1 - \frac{\binom{(1-\epsilon_c m)}{v}}{\binom{m}{v}},$$

where m is the size of server's fragment, and v is the number of blocks aggregated in a challenge.

Let u be the of uf−ecc advantage of an adversary for the composite dispersal code $ECC_d$ corrupting up to b servers in an epoch as given above. If we set $$\epsilon_q = \frac{\epsilon_{q,c}}{2}$$

and issue $n_q$ challenges in an epoch, the probability with which the client does not detect a corruption of $\epsilon_c$ fraction of blocks at a server with a correct code base is $$p_n \le e^{\frac{n_q(\epsilon_{q,c}-2\mu)^2}{8(\epsilon_{q,c}-\mu)}}.$$

Figure 5A:
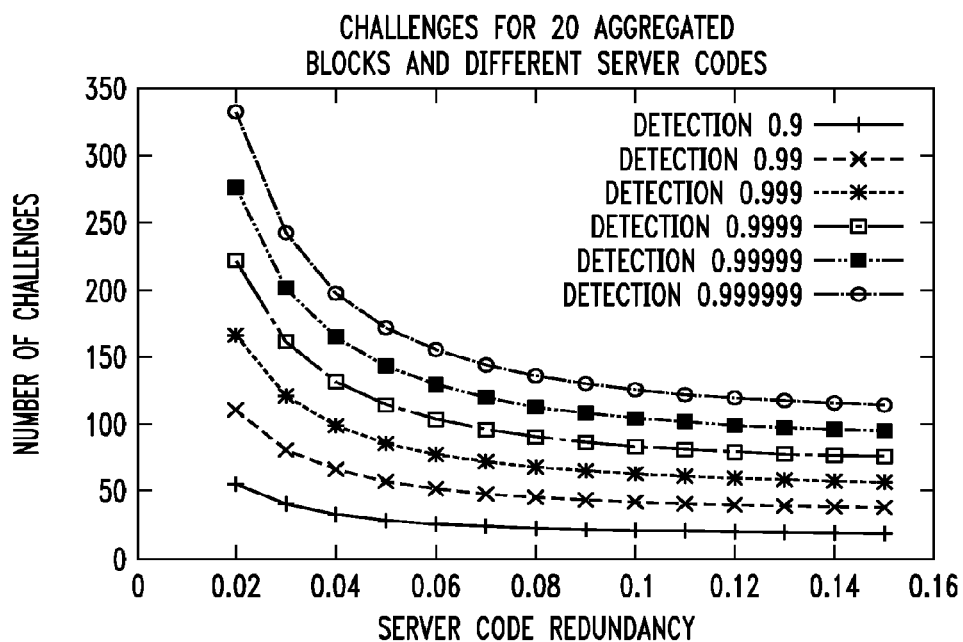
FIGS. 5A and 5B are graphs showing number of challenges as a function of server code redundancy and number of aggregated blocks, respectively, in illustrative embodiments.
Figure 5B:
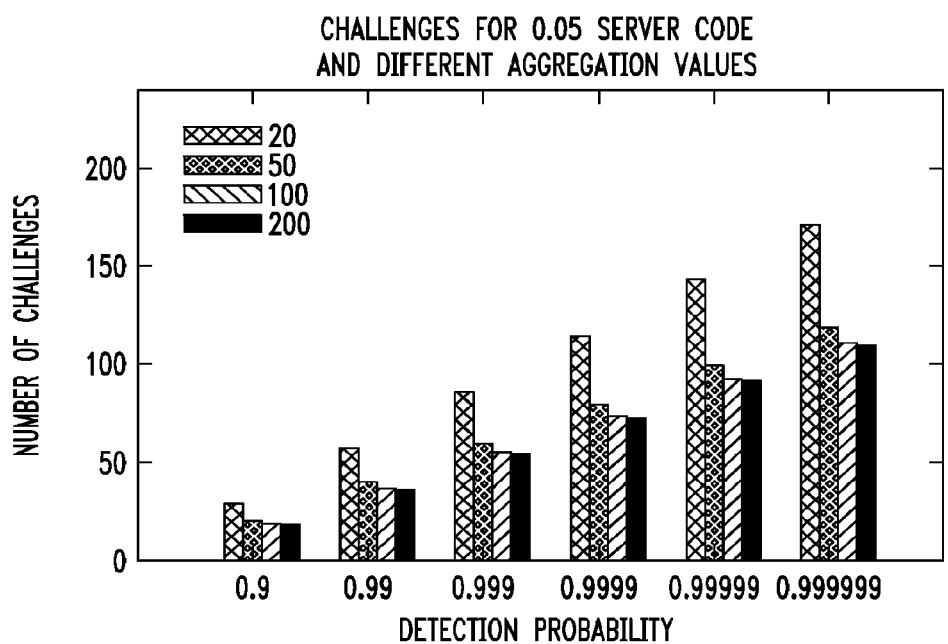

We can therefore choose the frequency of challenge-response interactions in an epoch based on the desired probability of detection $(1-p_n)$, the redundancy embedded in the server code and the number of aggregated blocks in a challenge, as is illustrated in FIGS. 5A and 5B. The graph in FIG. 5A assumes that 20 blocks are aggregated in a challenge, and shows that the number of challenges $n_q$ increases when the server code shrinks, and also when the detection probability increases. The graph in FIG. 5B assumes a server code with redundancy 0.05, and shows that the client needs to issue less challenges in an epoch if more blocks are aggregated in a challenge.

As noted above, the file is distributed in HAIL to l primary and n−l secondary servers. We assume that the dispersal code is an (n,l,d=n−l+1) IP-ECC code as described previously. The dispersal code can correct up to $$\left\lfloor \frac{n-l-1}{2} \right\rfloor$$

adversarial server corruptions in an epoch. We now look to compute an upper bound on the probability that HAIL becomes unavailable in a given time interval t.

The adversary controls up to b servers in epoch t and corrupted up to b servers in epoch t−1. Therefore, we can only guarantee that at least n−2b servers successfully completed at least one challenge-response round with the client in epoch t−1 with a correct code base, and still have a correct code base.

For those n−2b servers, there are still two cases in which a server's fragment is too heavily corrupted to be recovered even using server code: (1) The corruption level is below $\epsilon_c$, but the server code cannot correct $\epsilon_c$, a low probability side-effect of using an "adversarial code" or (2) The corruption level is $\ge \epsilon_c$, but the HAIL challenge-response protocol didn't successfully detect the corruption. We can bound the probability of Case (1) by γ given previously herein. The probability of Case (2) is bounded above by $p_n$.

These two bounds apply to a single server. In order to compute the availability of the entire HAIL system, we must treat the system as a stochastic process. Our goal, then, is to obtain an upper bound on the probability that enough fragments become unrecoverable that F is unavailable. We do so as follows.

It can be shown that the probability U that HAIL becomes unavailable in a time epoch is upper bounded by:

$$\left[ \frac{e^\beta}{(1+\beta)^{1+\beta}} \right]^{(n-2b)(\gamma+p_n)}, \text{ for}$$

$$\beta = \frac{n-2b-l-1}{(n-2b)(\gamma+p_n)} - 1, \text{ if}$$

$$b < \frac{n-l-1}{2} \text{ and } \gamma + p_n < \frac{n-2b-l-1}{n-2b}.$$

$$1-[1-(\gamma+p_n)]^{l+1}, \text{ if } b = \frac{n-l-1}{2}.$$

It can also be shown that the probability that HAIL becomes unavailable over an interval of t epochs is upper bounded by tU, with U as given above.

Figure 6A:
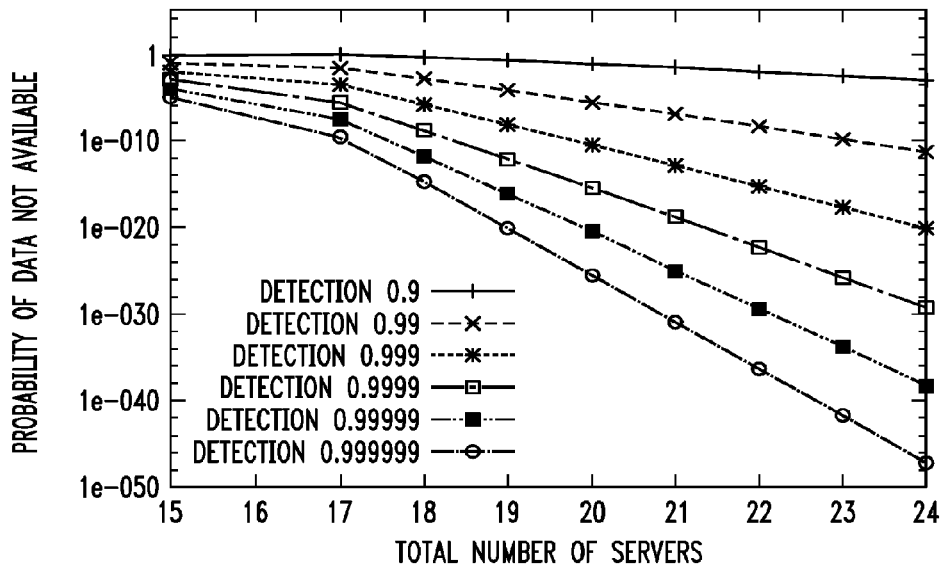
FIGS. 6A and 6B are graphs showing probability of unavailability for respective cases involving a constant number of primary servers and a constant number of total servers in illustrative embodiments.
Figure 6B:
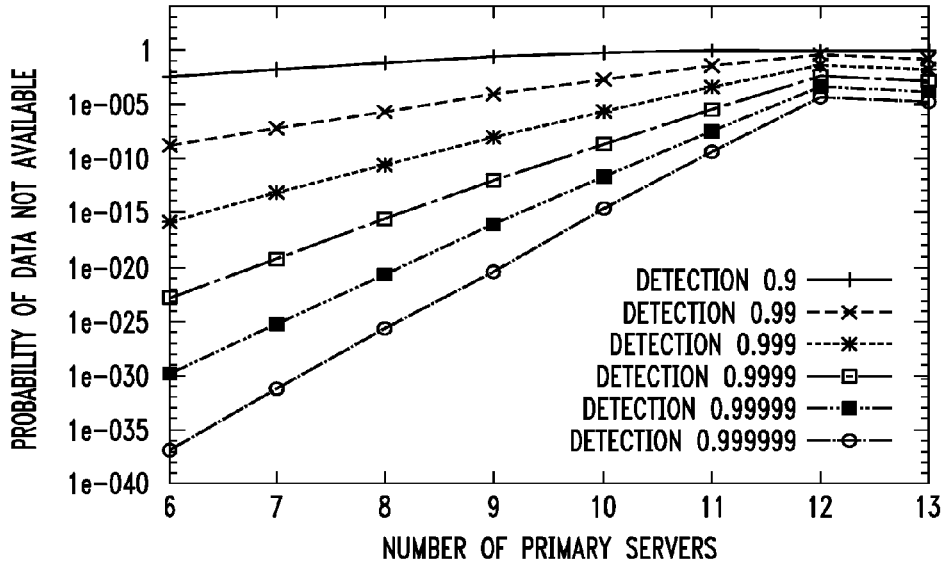

FIGS. 6A and 6B illustrate the availability of HAIL per epoch for 3 faults tolerated in an epoch, different configurations for the dispersal code and different detection probabilities. In the graph in FIG. 6A, the number of primary servers is fixed to 8 and the number of total servers varies from 15 to 24. In the graph in FIG. 6B, the total number of servers is constant at 20 and the number of primary servers is between 6 and 13.

Assume that an epoch is a week, and file availability is computed for 2 years or about 100 epochs. Then a $10^{-6}$ unavailability target for 3 years translates to $10^{-8}$ unavailability per epoch. This level of availability can be obtained, for instance, from a (17,8) dispersal code at detection level 0.99999 or (20,9) code at detection level 0.999. Once the detection level is determined, parameters such as server code redundancy and frequency of challenge-response protocol in an epoch can be determined from FIGS. 5A and 5B.

The security experiment in FIG. 4 defines a very strong adversarial model: As $\mathcal{A}$ is fully Byzantine, it can corrupt both the code base and the storage systems of servers. However, alternative security models may be used. For example, as servers and storage can be separate systems, a possible alternative security model is one in which the adversary only corrupts storage systems. Such a "storage-limited" adversarial model yields better security bounds: n−b servers are needed to decode the file instead of n−2b (under the technical condition that n−b≧l+1). Table 1 below illustrates several code parameters and the availability they offer for the weaker, "storage-limited" adversarial model.

TABLE 1

Several code parameters and their availability per epoch for a weaker model.

| b | n | l | Unavailability | Detection |
|---|---|---|---|---|
| 1 | 3 | 1 | $2.10^{-6}$ | 0.999999 |
| 1 | 4 | 2 | $3.10^{-6}$ | 0.999999 |
| 1 | 5 | 3 | $4.10^{-6}$ | 0.999999 |
| 1 | 6 | 2 | $4.10^{-9}$ | 0.99999 |
| 2 | 5 | 2 | $3.10^{-6}$ | 0.999999 |
| 2 | 6 | 3 | $4.10^{-6}$ | 0.999999 |
| 2 | 7 | 4 | $5.10^{-6}$ | 0.999999 |
| 2 | 8 | 3 | $6.10^{-9}$ | 0.99999 |
| 3 | 6 | 2 | $3.10^{-6}$ | 0.999999 |
| 3 | 7 | 3 | $3.10^{-6}$ | 0.999999 |
| 3 | 8 | 4 | $5.10^{-6}$ | 0.999999 |
| 3 | 9 | 3 | $6.10^{-9}$ | 0.99999 |

An illustrative embodiment of HAIL was implemented and tested as will now be described. This implementation used Java code on an Intel Core 2 processor running at 2.16 GHz. The Java virtual machine was given 1 GB of memory and all cryptographic operations used the Java implementation of RSA BSAFE.

The dispersal code was constructed using a Reed-Solomon coder from the Jerasure optimized library written in C. See J. S. Plank et al., "A performance evaluation and examination of open-source erasure coding libraries for storage," USENIX FAST, 2009.

The server code was constructed using a Reed-Solomon (223,255,32) encoder over $GF[2^8]$, extended via striping to operate on 32-byte symbols, i.e., $GF[2^{256}]$. To obtain a server code with 4% redundancy, we truncate the last 23 symbols of a codeword, effectively implementing a (223,232,9) server code.

The file is encoded in a single pass to minimize the cost of disk accesses. Since we use Reed-Solomon codes for implementing both the dispersal and server codes, computation of parity blocks involves associative operations in a Galois field.

For an incremental encoding of the file (i.e., in a single pass), we store the parity blocks into main memory, and update them when we process a file chunk in memory. However, we pay some performance cost for incremental encoding, since existing Reed-Solomon implementations are highly optimized if the whole message is available at encoding time.

Figure 7A:
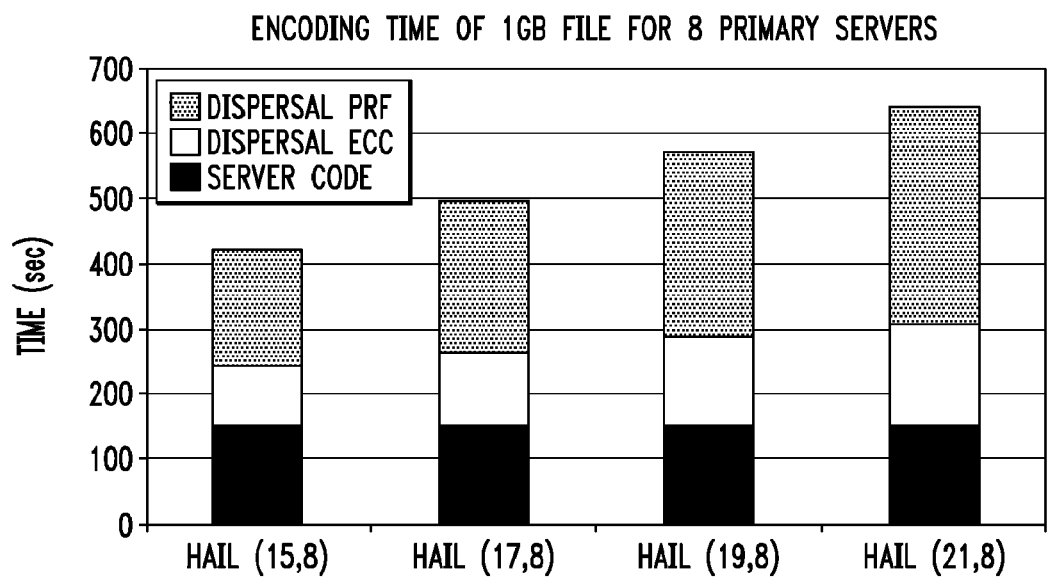
FIGS. 7A and 7B are graphs showing encoding time for respective cases involving a constant number of primary servers and a constant number of total servers in illustrative embodiments.
Figure 7B:
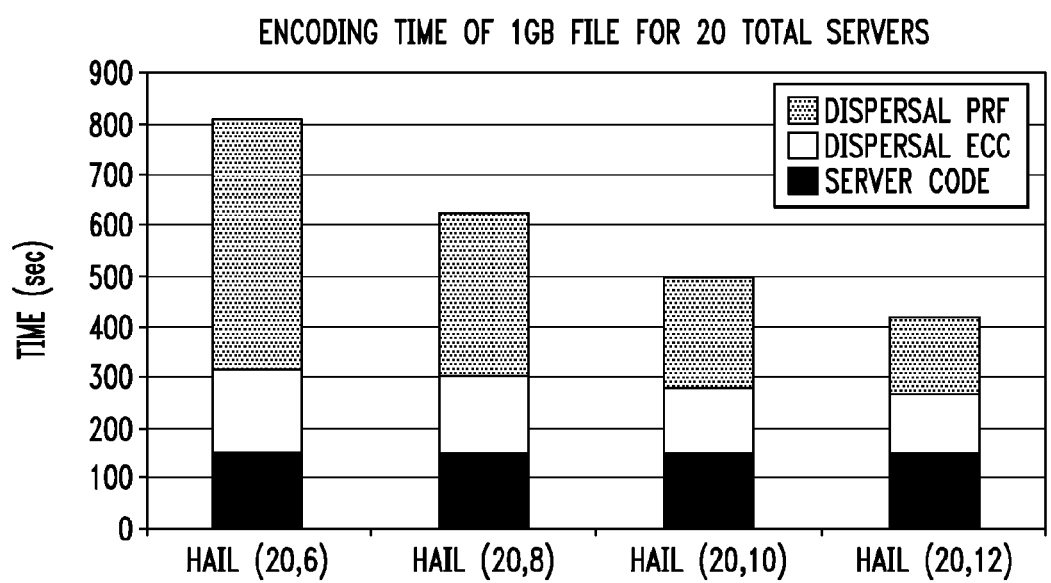

FIGS. 7A and 7B show the encoding cost in HAIL for a 1 GB file divided into several components: server code application, dispersal code encoding, and application of PRF to the parity blocks. Reflecting parameter choices from FIGS. 6A and 6B, the graph in FIG. 7A presents the encoding cost as the number of primary servers remains constant at 8 and the total number of servers varies from 15 to 23. The graph in FIG. 7B presents the encoding cost as the total number of servers remains constant at 20 and the number of primary servers varies between 6 and 12.

As is apparent from these graphs, the server code cost is only dependent on the file size, and is independent on the number of servers. The cost of the dispersal code increases linearly with the number of secondary servers. The high performance cost of PRF application to the parity blocks is mainly due to the Java BSAFE implementation.

The results are shown for an unoptimized Java encoding. Other embodiments may implement a C version of HAIL encoding, which may be expected to substantially improve encoding performance.

The illustrative HAIL embodiments described herein provide a number of significant advantages over conventional techniques for distributed storage. For example, HAIL ensures file availability against a strong, mobile adversary. As noted previously, a mobile adversary is one capable of progressively attacking storage providers and, in principle, ultimately corrupting all providers at different times. The failure of conventional approaches to address such an adversary is a serious deficiency that undermines their security, particularly in cloud storage environments. Other advantages of HAIL in the illustrative embodiments include strong file-intactness assurance, low overhead, and direct client-server communication.

There are numerous variants of HAIL that can be implemented in alternative embodiments of the invention. For example, the exemplary protocols described above for HAIL provide assurance for static files, but alternative embodiments can be configured to accommodate file updates, e.g., small changes to blocks of F.

Also, the dispersal code described above is applied to blocks according to a fixed structure, namely "horizontally" across servers. Consequently, an adversary that observes modification of a file block on one server can, when moving to other servers, easily locate and attack blocks belonging to the same dispersal codeword. Such an adversary can corrupt a file block in a surgically precise manner, making such corruption hard to detect. It is possible, however, to randomize the position of dispersal codeword symbols individually on servers. If blocks are then proactively shuffled on each server after every epoch, an adversary cannot feasibly infer the position of dispersal codeword elements across servers. It therefore cannot corrupt a dispersal codeword without a high level of collateral damage, i.e., a globally detectable level of corruption. By restricting randomization and shuffling to parity blocks, we can render the proactivization step more efficient.

As indicated above, the HAIL functionality can be implemented at least in part in the form of one or more software programs stored in memory and executed by a processor of a processing device such as client device 102 or controller 108. As indicated previously, a memory having such program code embodied therein is an example of what is more generally referred to herein as a "computer program product."

It should again be emphasized that the above-described embodiments of the invention are presented for purposes of illustration only. Many variations and other alternative embodiments may be used. For example, although described in the context of particular system and device configurations, the techniques are applicable to a wide variety of other types of storage systems and processing devices. The particular process steps used to encode, decode and verify a given file may be varied in alternative embodiments. Also, the types of server codes, dispersal codes and aggregation codes used in a given alternative embodiment may be varied relative to the arrangements of the illustrative embodiments. In addition, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
   separating a file into a plurality of blocks;
   allocating subsets of the blocks to respective primary servers;
   applying a code of a first type to the subsets of the blocks to expand the subsets by generating one or more additional blocks for each subset;
   storing the expanded subsets of the blocks on the respective primary servers;
   applying a code of a second type to groups of blocks each including one block from each of the expanded subsets to expand the groups by generating one or more additional blocks for each group; and
   storing the one or more additional blocks for each expanded group on respective secondary servers;
   wherein the first and second codes are configured to provide security against an adversary that is able to corrupt all of the servers over multiple periods of time but only a subset of the servers within any particular one of the periods of time.

2. The method of claim 1 wherein a given one of the periods of time has a specified length and said security provided against the adversary is characterized by a security bound specifying a maximum number of block corruptions that are permitted to occur within the given period of time.

3. The method of claim 2 further including the steps of:
   issuing challenges to respective ones of the servers for the given period of time; and
   processing responses to the challenges to determine if the number of block corruptions detected for the given period of time exceeds the specified maximum number of block corruptions.

4. The method of claim 3 wherein the issued challenges have a characteristic determined at least in part based on one or more of the specified length of the given period of time and the specified maximum number of block corruptions.

5. The method of claim 4 wherein the characteristic includes at least one of a minimum number of challenges to be issued within the given period of time and a minimum number of stored blocks addressed by each of the challenges.

6. The method of claim 4 wherein particular ones of the stored blocks to be addressed by a given one of the challenges are randomly selected.

7. The method of claim 3 wherein one or more blocks that have each been determined to be corrupted are recovered utilizing other blocks stored on other ones of the servers.

8. The method of claim 3 wherein the processing step further comprises the step of verifying an aggregation code combining information associated with multiple ones of the responses.

9. The method of claim 8 wherein the aggregation code combines multiple message authentication codes from respective ones of the servers into a composite message authentication code for multiple ones of the blocks with each such composite message authentication code being associated with a corresponding codeword of the code of the second type.

10. The method of claim 3 wherein each of the challenges comprises a seed $\kappa_c$ and a value $u \in I$ and further wherein in responding to its received challenge a given one of the servers $S_j$ derives from the seed $\kappa_c$ a subset of rows $D = i_1, \ldots, i_v$ in an encoded matrix comprising the stored blocks and returns a response comprising a linear combination of the particular ones of the blocks it stores in the rows of the subset D, said response being denoted by $R_j$, with $R_j$ being computed as the $u^{th}$ symbol in an aggregation code taken across the rows of the subset D.

11. The method of claim 10 wherein responses $R_1, \ldots, R_n$ from respective ones of the plurality of servers represent a linear combination of rows $i_1, \ldots, i_v$ of the subset D with coefficients $a_i = u^{i-1}, i = [1,v]$, where v denotes a message size of the aggregation code, and the responses are verified by first combining the responses to form a composite response $R = (R_1, \ldots, R_n)$ and then checking to determine if the composite response corresponds to a codeword of the code of the second type.

12. The method of claim 1 wherein the code of the first type comprises an adversarial server code.

13. The method of claim 1 wherein the code of the second type comprises a dispersal code.

14. The method of claim 13 wherein the dispersal code comprises an integrity-protecting error-correcting code having codewords each providing a message authentication code based on a composition of a universal hash function with a pseudorandom function.

15. The method of claim 14 wherein the integrity-protecting error-correcting code comprises an (n,l,d) Reed-Solomon code modified by applying a pseudorandom function to s code symbols of a given codeword of the Reed-Solomon code in order to generate the message authentication code for the corresponding codeword of the integrity-protecting error-correcting code, where n denotes the total number of primary and secondary servers, l denotes the number of primary servers, d denotes the minimum distance between any two Reed-Solomon codewords, and $1 \leq s \leq n$.

16. The method of claim 1 further including the step of proactively redistributing at least a portion of the blocks over the servers in each of a plurality of the periods of time.

17. A computer program product comprising a processor-readable storage medium having encoded therein executable code of one or more software programs, wherein the one or more software programs when executed by a processor implement the steps of the method of claim 1.

18. A method comprising the steps of:
separating a file into a plurality of blocks;
forming a set of blocks including the plurality of blocks and one or more additional blocks;
storing the blocks of the set over a plurality of servers;
issuing challenges to respective ones of the servers for each of multiple periods of time with each such period being of a specified length; and
processing responses to the challenges to determine if a number of block corruptions exceeds a specified maximum number for any of the periods of time;
wherein the issued challenges have a characteristic determined at least in part based on one or more of the specified length of the periods of time and the specified maximum number of block corruptions.

19. The method of claim 18 wherein the characteristic includes at least one of a minimum number of challenges to be issued within a given one of the periods of time and a minimum number of the stored blocks addressed by each of the challenges.

20. An apparatus comprising:
a processing device including a processor, a memory coupled to the processor, and a network interface configured to support communication between the processing device and a plurality of servers;
wherein the processing device further comprises a file encoding module configured to separate a file into a plurality of blocks, to allocate subsets of the blocks to respective primary servers of the plurality of servers, to apply a code of a first type to the subsets of the blocks to expand the subsets by generating one or more additional blocks for each subset, store the expanded subsets of the blocks on the respective primary servers, to apply a code of a second type to groups of blocks each including one block from each of the expanded subsets to expand the groups by generating one or more additional blocks for each group, and to store the one or more additional blocks for each expanded group on respective secondary servers of the plurality of servers;
wherein the first and second codes are configured to provide security against an adversary that is able to corrupt all of the servers over multiple periods of time but only a subset of the servers within any particular one of the periods of time.

21. The processing device of claim 20 wherein said processing device comprises a client device.

22. The processing device of claim 20 wherein said processing device further comprises a file decoding module configured to reconstruct the file from blocks retrieved from the primary and secondary servers.

23. The processing device of claim 20 wherein said processing device further comprises a challenge-response module configured to issue challenges to respective ones of the servers, and to process responses to the challenges to determine if the number of stored blocks containing faults exceeds a specified threshold.

24. A distributed storage system comprising:
a plurality of servers; and
at least one processing device configured to communicate with the plurality of servers;
wherein the processing device comprises a file encoding module configured to separate a file into a plurality of blocks, to allocate subsets of the blocks to respective primary servers of the plurality of servers, to apply a code of a first type to the subsets of the blocks to expand the subsets by generating one or more additional blocks for each subset, store the expanded subsets of the blocks on the respective primary servers, to apply a code of a second type to groups of blocks each including one block from each of the expanded subsets to expand the groups by generating one or more additional blocks for each group, and to store the one or more additional blocks for each expanded group on respective secondary servers of the plurality of servers;

wherein the first and second codes are configured to provide security against an adversary that is able to corrupt all of the servers over multiple periods of time but only a subset of the servers within any particular one of the periods of time.

25. The system of claim 24 wherein the processing device comprises a client device.

* * * * *